United States Patent [19]

Lerman et al.

[11] Patent Number: 4,822,570
[45] Date of Patent: Apr. 18, 1989

[54] THERMAL SENSING APPARATUS IN OUTLET NOZZLE

[75] Inventors: Michael J. Lerman, Edison, N.J.; Jean M. Hamert, Hoenheim, France

[73] Assignee: De Dietrich (USA), Inc., Union, N.J.

[21] Appl. No.: 936,557

[22] Filed: Dec. 1, 1986

[51] Int. Cl.⁴ .......................................... G01N 25/00
[52] U.S. Cl. ................................ 422/119; 422/99; 422/103; 374/165; 374/209; 137/457
[58] Field of Search .................. 422/99, 103, 119; 374/165, 208, 209; 137/457

[56] References Cited

U.S. PATENT DOCUMENTS

| | | | |
|---|---|---|---|
| 2,343,242 | 3/1944 | Richmond | 374/208 |
| 3,272,589 | 9/1966 | Huston | 422/119 |
| 3,592,039 | 7/1971 | Chilton | 374/165 |
| 4,464,066 | 8/1984 | Cappuccili | 374/208 |
| 4,585,622 | 4/1986 | Bowe et al. | 422/99 |
| 4,614,443 | 9/1986 | Hamert | 374/208 |

FOREIGN PATENT DOCUMENTS

| | | | |
|---|---|---|---|
| 0187915 | 7/1986 | European Pat. Off. | 422/103 |
| 2510707 | 2/1983 | France | 137/457 |
| 2534660 | 4/1984 | France | 137/457 |
| 2555313 | 5/1985 | France | |

Primary Examiner—Barry S. Richman
Assistant Examiner—Lynn M. Kummert
Attorney, Agent, or Firm—Pennie & Edmonds

[57] ABSTRACT

A valve supports a thermal sensing apparatus within an outlet nozzle of a reaction vessel. The valve includes a head with a socket closed by a disc and a stem providing a bore communicating with the socket and a measuring end defined by the disc. The sensing element of the sensing apparatus is located to a sensing position at the measuring end of the valve for fast response to a thermal change in the contents within the vessel. Substantially any form of sensing element may be incorporated in the valve and the sensing element is spring biased toward the measuring end.

7 Claims, 2 Drawing Sheets 4,822,570

THERMAL SENSING APPARATUS IN OUTLET NOZZLE

CROSS REFERENCE TO RELATED APPLICATION

This application relates to application Ser. No. 889,570, filed July 25, 1986, and assigned to the assignee of the present invention.

1. Technical Field

The invention relates to thermal sensing apparatus for use with reactor vessels in the chemical industry. The thermal sensing apparatus is incorporated in a valve stem and head movable with respect to a bottom outlet nozzle of the vessel, providing a universal mount for thermal sensors.

2. Background of the Invention

It is known in the prior art that the temperature of reactants and their reaction product may be sensed by mounting a thermal sensing apparatus on the head of a valve located within a bottom outlet nozzle of a reaction vessel of the type used in the chemical industry. Locating a thermal sensing apparatus in this orientation has been found to provide several advantages. Perhaps foremost of the advantages is that the location of the thermal sensing apparatus is within substantially the lowest level temperature sensing positioning so that the thermal sensing apparatus will contact the reactants and their reaction product (hereafter "batch") even though the batch may be concentrated down to only a small volume. As would appear apparent, under conditions of sensing the temperature of the batch by a baffle tip arrangement it may be that the batch whose temperature is to be sensed no longer contacts the sensing elements of the thermal sensing apparatus, and temperature indications that are obtained are those representing the temperature of the vapor which may be substantially different than the temperature of the liquid. This may give rise to a dangerous situation.

The prior art thermal sensing apparatus may be considered to include a metallic thermowell mounted on and sealed to the head of the valve. Usually the thermowell has been formed of tantalum and sealed to the head of the valve by a polytetrafluoroethylene (hereafter referred to as PTFE) gasket. A temperature sensor is received in the thermowell tip, and disposed as close as possible to the tip and the batch. The prior art sensing apparatus also includes a metallic (tantalum) tip containing a sensing element, such as an RTD sensor glued or potted in place within the tip. Sensing elements of the latter type have been found to respond very rapidly to a temperature change of the batch being monitored.

These prior art constructions, however, have been found to suffer from several disadvantages. A first disadvantage is the necessity to construct a special valve stem and head to accommodate the thermowell and tip. Another disadvantage resides in the use of the PTFE gasket between the tip and valve head. A further disadvantage resides in the fact that the batch within the vessel is exposed to additional metal and in vessels of glass-lined construction, this generally is an undesirable condition.

The prior art also includes a form of thermocouple temperature sensor either with single or duplex sensing elements. These last-mentioned thermal sensing apparatus also suffer from the disadvantage that they require a special valve head and stem, which overall, does not lend itself to any measure of universality of acceptance of other types of thermal sensing apparatus. Also, these theromcouple elements are permanently installed and cannot be replaced in the field if they malfunction.

SUMMARY OF THE INVENTION

The invention is in a thermal sensing apparatus for use with reactor vessels in the chemical industry including a valve supported by an outlet nozzle of the vessel. The valve includes a head including a socket and a stem including a bore communicating with a socket. A disc closes the socket and defines a measuring end of the valve. The disc is formed of a heat conductive material and has a thickness of no more than about 2mm to limit thermal inertia. A sensing element of a sensing means of substantially any type may be received into the bore and socket of the valve and into position against the measuring end. Means are provided to support the sensing element against the measuring end.

The support means which cooperate with the sensing element may comprise a spring, and the disc may be coated throughout the internal surface with a heat conductive ceramic. By provision of a heat conductive grease on the sensing element and the physical location of the sensing element against the measuring end, rapid, accurate sensing of temperature will be possible.

Importantly, the construction of the valve permits substantially universal receipt of sensing means including, but not limited to single or multiple RTD's thermocouples, thermistors and combinations of multiple sensors including those previously mentioned.

BEST MODE FOR CARRYING OUT THE INVENTION

Figure 1:
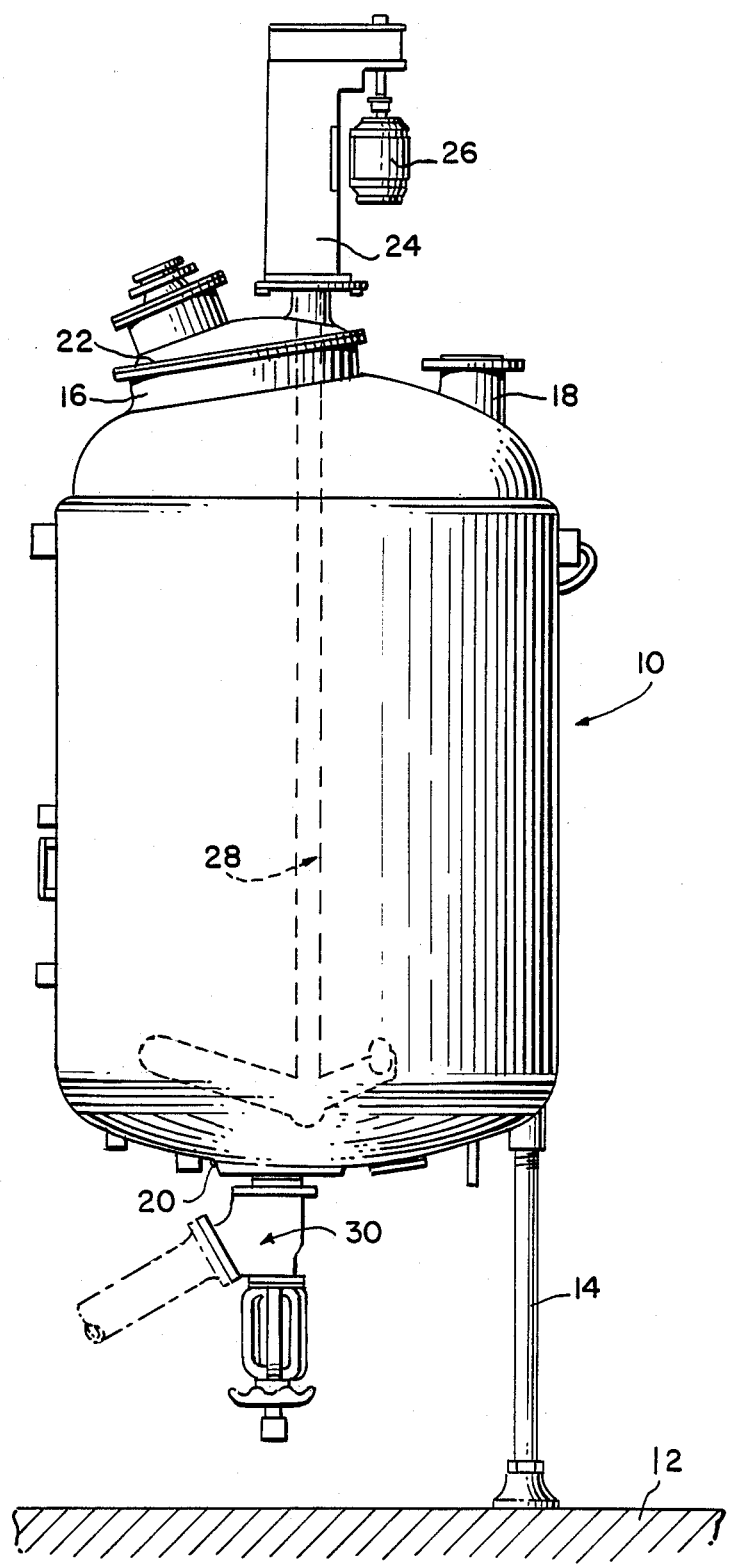
FIG. 1 is a view in elevation of a reaction vessel and thermal sensing apparatus mounted in an outlet nozzle of the vessel.

Referring to FIG. 1, there is a showing of a reaction vessel 10 of a type well known to the chemical industry. The vessel will only be generally described, and is illustrated primarily for the purpose of providing a showing of the environment within which a thermal sensing apparatus of the invention may be used. The vessel is adapted for use in carrying out a host of reactions involving reactants and their reaction products which may have a corrosive or abrasive nature, or both, among other deleterious characteristics. As may be well known, the reactions may be carried out under conditions within the vessel of high pressure, and they may be carried out in vessels that are quite large. Typically, a vessel of this type may have a capacity of a thousand or more gallons. In view of the nature of the batch, the interior walls of the vessel comprising the underlying substrate are coated. A coating, for example, of a vitreous or partially devitrified material, a ceramic or an enamel has been found to obviate any deleterious effect that the batch otherwise would have on the exposed substrate.

Vessel 10, of the type described, may be supported on a supporting surface 12 by plurality of legs 14 extending from the bottom of the vessel. The legs (only one leg is shown in FIG. 1) normally will be located at equidistant spacing for support of the vessel. Each leg may have a vertical adjustment capability. The supporting surface may be a floor of a plant, for example.

Vessel 10 includes one or more nozzles or openings. Thus, FIG. 1 illustrates a nozzle 16 within the top of the vessel which may be characterized as providing a main opening, and a nozzle 18 also within the region of the top of the vessel. A further nozzle 20 comprising an outlet nozzle is located within the region of the bottom of the vessel. Other nozzles or openings may be located within those regions and other regions of the vessel to accommodate structure for uses outside of the scope of this invention.

As illustrated, the main opening 16, although more particularly a cover 22 supported by the main opening supports a mixer drive/shaft closure 24 and a motor 26 which drives an impeller assembly 28 for mixing the batch. The nozzle 18 may be used as entry for measuring or testing apparatus, as disclosed in application Ser. No. 889,570. Other features of the vessel not described should be considered to be conventional.

A valve/thermal sensing apparatus, generally illustrated by the numeral 30, extends into vessel 10 through the outlet nozzle 20 for purposes of functioning as a drain valve while sensing temperature of the batch within the vessel. The advantage that this disposition of the thermal sensing apparatus provides is that it is possible to sense a temperature of the batch at the lowest level possible. Otherwise, occasionally, when temperature is to be sensed by a thermal sensing apparatus within a baffle tip which may extend through the nozzle 18 into the confines of vessel 10, the batch will have concentrated down to a small volume so that the batch no longer contacts the baffle tip. As a result, the thermal sensing apparatus responds to the temperature of vapor, not liquid. The temperature of the liquid may be substantially higher than the temperature of the vapor. This, obviously, can be a very dangerous situation. Another advantage of the location of the thermal sensing apparatus within structure at the outlet nozzle is that it no longer will be necessary for an individual to enter the vessel to change a temperature sensor as is necessary with some fast-response temperature sensing apparatus. Entry into a vessel by an individual is an extremely costly process because of the requirement to decontaminate the vessel, and the necessity of safety checks, as well as the resort to other safety considerations that are required.

Figure 2:
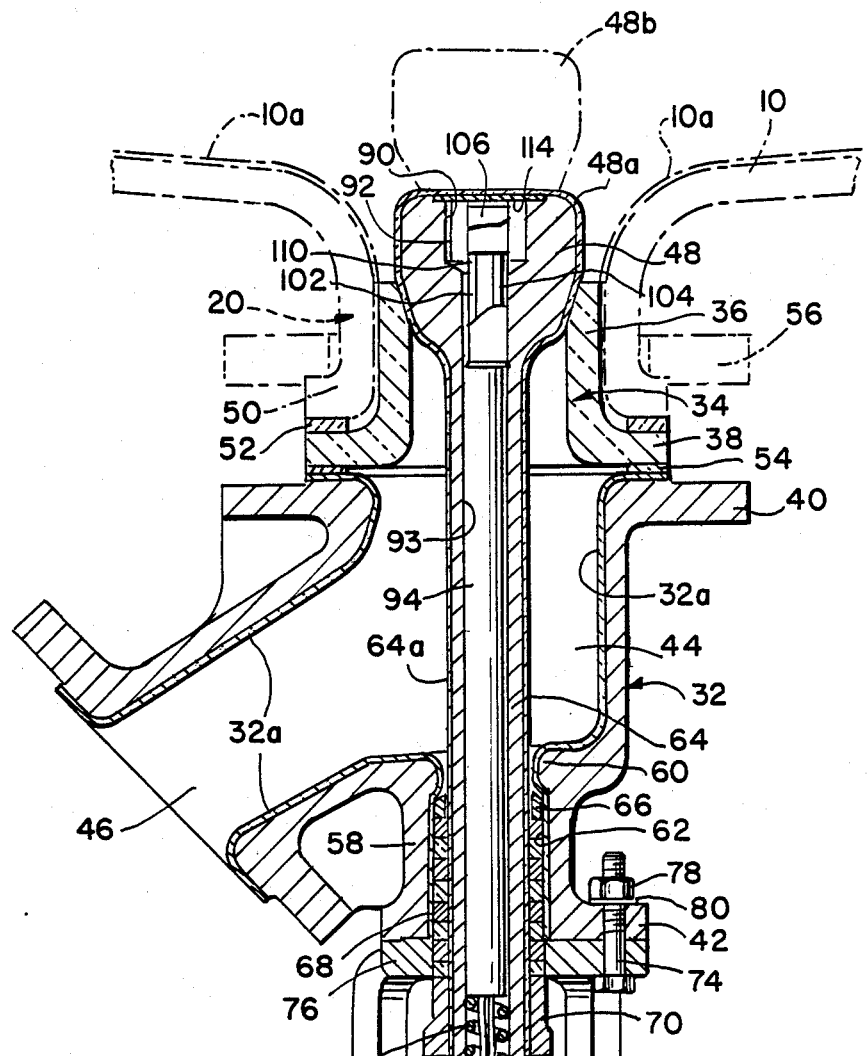
FIG. 2 is a sectional view, in a scale larger than the scale of FIG. 1, of the thermal sensing apparatus in its mounted orientation.

As perhaps best seen in FIG. 2, the thermal sensing apparatus of the invention (hereafter "sensor") includes a valve located in the outlet nozzle 20 of vessel 10. This location of structure permits change of the sensor without having to enter into the vessel. As indicated, this capability overcomes the necessity of costly decontamination checks, checks for safety and so forth, all as known to be required in this art. Regardless of the type of sensor employed it may be changed by at most the action of removal of the valve.

Turning to FIG. 2, both the outlet nozzle 20 and the fragmentary showing of vessel 10 are shown in dot-dash line. The glass lining of the vessel 10 is also shown in dot-dash line at 10a.

The outlet nozzle is located in the bottom region of vessel 10, functioning as the mounting for a flush-type outlet valve. The outlet nozzle is sealed by structure and an operation to be discussed.

The flush-type outlet valve includes a valve body 32 and a valve seat 34. The valve seat is formed by a collar 36 and a base 38 flared outwardly from the longitudinal axis of the collar. The valve seat provides a path of flow of batch through the outlet nozzle. The valve body is elongated in length between a lip 40 and a base 42, each of which defines substantially a flat, annular surface. The surfaces extend outwardly from the elongated portion of the body and the longitudinal axis of the outlet nozzle. A chamber 44 is located within the valve body to communicate an outlet opening 46 and the path of flow of batch through the outlet nozzle. A valve head 48 seals the valve seat 34 and may be moved from a closed, shown in full, to an open position, illustrated in dot-dash line at 98b, to open the valve seat. Movement of the valve head is along the longitudinal axis.

Valve seat 34 is sealed within the outlet nozzle 20. To this end, outlet nozzle 20 which extends concentrically around the valve seat is formed with a base 50 flared outwardly to a location substantially coextensive with that of the base 38 of the valve seat 34. In a mounted orientation of structures, base 38 resides between the lip 40 of valve body 32 and the base 50 of outlet nozzle 20. A gasket 52 is positioned between the base 38 and base 50, and a gasket 54 is positioned between the base 38 and lip 40. A ring 56 resides against the shoulder formed by the base 50 and together with the lip provides a pair of spaced annular surfaces to accommodate a plurality of bolts and nuts or other locking device (not shown) for drawing the base 50 and lip 40 together.

As previously indicated, the vessel 10 is coated within its interior surface. The coating 10a extends throughout the internal surface of the outlet nozzle 20, at least to the region of gasket 52. The valve body 32 is similarly coated at 32a throughout the area of chamber 44, outlet opening 46, a portion of the annular surface of lip 40 (at least throughout the region coextensive with gasket 54), and throughout a neck portion 58 below the chamber 44. As the vessel itself, valve body 32 may be formed of steel or the equivalent, and coated with the same material used for coating the vessel. The valve seat may be formed of PTFE or glass-filled PTFE and the gaskets 52, 54 may be formed of a compressible material enveloped in PTFE.

The neck portion 58 of valve body 32 is defined by a ring protuberance 60 extending toward the longitudinal axis of the outlet nozzle and an annular wall 62 which terminates at the flat, annular surface of base 42. The ring protuberance provides a bearing surface for a neck ring 66. A series of packing rings 68 are located radially between the valve stem 64 and neck portion 58, and are axially located between neck ring 66 and a follower 70. The follower may be formed of steel, the neck ring may be formed of PTFE and the packing ring may be a PTFE/graphite composition. The packing rings seal chamber 44 from the atmosphere.

A frame 72 depends from valve body 32 and is secured to the valve body by a plurality of bolts 74. For example, four bolts, which extend through a flange extension 76 of the frame and base 42, may be used. Each bolt is secured by a nut 78 and lockwasher 80.

The specific construction of the valve head 48 and valve stem 64, to provide a capability of sensing batch temperature will be described as the description continues. In general, however, the valve stem extends from the valve head to a location within frame 72 and connects with an extension 82. The connection may be completed within the region 84 by provision of internal and external threads on the valve stem and extension, or vice versa. The extension is keyed or otherwise connected to a handwheel 86 for movement of the valve head 48 to and from a position on valve seat 34. The handwheel is supported by a retainer (not shown) and mounted to the frame 72 by a plurality of bolts 88.

As illustrated, both the valve head 48 and valve stem 64 are coated throughout the surfaces 48a and 64a with a coating like the coating on the surfaces of vessel 10. The valve otherwise may be formed of steel. Since packing rings 68 seal the chamber 44, the coatings which are continuous around the valve head and along the valve stem need only be applied along the length of the valve stem which will be exposed to the batch in chamber 44 when the valve head 48 moves from valve seat 34 and the batch flows from the vessel into the chamber.

As illustrated in FIG. 2, the valve head 48 when closed (the full line position) against valve seat 34 is located in position about flush with or only slightly below the inside bottom of the inclined well of vessel 10. This location of the valve head 48 and sensor 92 permits a constant monitoring of the temperature of the batch that shall contact the sensor.

Valve head 48 includes a socket 90 for receipt of the sensor 92. The sensor is characterized in part by a tube 94 formed preferably of metal, such as stainless steel, received through a bore 93 of valve stem 64. The tube supports the sensor in socket 90 and against a disc 114 which defines a measuring end of the valve head 48. Disc 114 (to be discussed below) closes the end of the socket and is coated by the same glass outer coating 48a as is the valve head 48.

Figure 3:
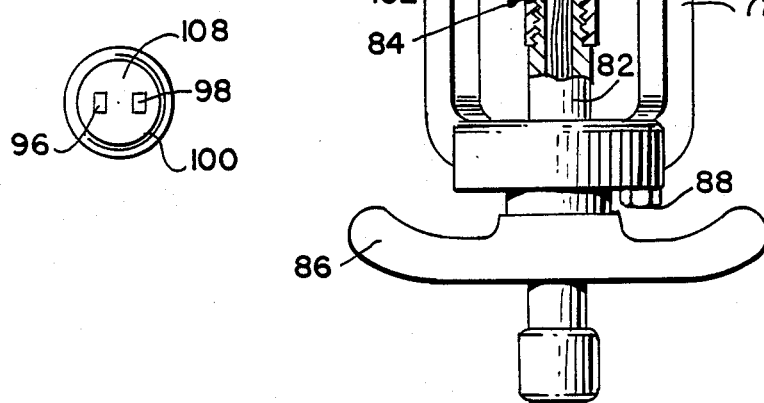
FIG. 3 is a plan view of the measuring end illustrating the sensing elements of the thermal sensing apparatus.

The measuring head of sensor 92 comprises an epoxy resin material which supports one or more sensing elements in a partially embedded condition (see FIG. 3, which illustrates two sensing elements 96, 98). As illustrated in FIG. 3, the measuring head or tip is chamfered at 100 at an angle of about 45°. Both sensing elements are flush with the surface of the epoxy so that they will contact the flat, bottom surface of disc 114 at the measuring end of socket 90. As such, the tip will be as closely spaced from the batch whose temperature is to be sensed for as quick a response as possible. A heat conductive grease may be applied to the end surface of the tip. The sensing elements may comprise a pair of platinum RTD sensing elements, each having a characteristic impedance of 100 ohms at 0° C. ($\alpha=0.385$ ohm/°C.).

A pair of wire sets 102, 104 are connected (the connection is not shown) to the sensing elements and connect the sensing elements to a remote electrical monitoring apparatus. The wires, preferably, are supported within the region of the connection by a body of expanded glass 106 which, for example, exhibits a very low thermal inertia. The body of expanded glass, thus, enhances a fast response in measurement of batch temperature as the batch temperature may change. The body of expanded glass is confined between the epoxy of the tip and a closure 110 or epoxy seal which may comprise an annular plate. The wires extending through the closure may be stranded silver or copper wires with an insulative coating of PTFE.

It is important that the sensing elements 96, 98 reside as close as possible to the flat, bottom surface of disc 114. In this manner it is possible to minimize thermal inertia and provide good response time in the measurement or detection of batch temperature as the temperature may change.

Extension 82 provides a mounting device for mounting the sensor 92 in the temperature measuring position, as seen in FIG. 2. The extension consists generally of a tube assembly which confines a spring 112 capable of acting in compression on the end of the tube 94 to move it axially into socket 90 and against disc 114.

The socket 90 of valve head 48 may take various forms for purposes of mounting the sensor 92. In the form illustrated in FIG. 2, the socket is formed by a counterbore along the longitudinal axis of the valve head and a chamfered surface that merges into the bore 93 of valve stem 64. The socket may be of substantially any dimension for receipt of a sensing apparatus.

The disc 114 closes the end of the socket, below coating 48a. The plate will be formed of a metal displaying good thermal characteristics, such as mild steel. A plate of this material has been used successfully and is preferred. The plate may be about 1/16 inch (about 1.6 mm) in thickness, a thickness which has been found sufficient in combination with the diameter of the disc to sustain the forces of agitation and normal pressure ranges within vessel 10 without undergoing a degree of deflection that will crack the material of coating 48a applied to the outer surface of valve head 48. The thickness of the disc at the measuring end, however, is a compromise since it should also be thin enough to reduce the thermal inertia of the tip to not overly affect fast response time to batch temperature change. The thickness of the coating material at the measuring end also must be carefully controlled to balance a fast temperature response favored by a thin coating of glass, for example, with a corrosion and abrasion resistance characteristic favored by a thicker coating of coating material. The thickness of the coating 48a may be about 0.75 to 1.3 mm. The diameter of disc 114 may be about 30 mm, a diameter which has been found sufficient to reduce the thermal inertia of the tip to not overly effect fast response to batch temperature change.

A heat conductive ceramic coating material is used to coat the surface of disc 114 exposed within socket 90 of valve head 48. The coating may be ceramic stainless steel cement of Cotronics Corporation. This type of coating does not create a thermal barrier which would have the effect of increasing the response time of the sensing apparatus and importantly serves as a preventative against corrosion of the disc. The coating preferably will be used throughout the surface of the socket 90 to prevent scale, even in a small amount, from collecting and possibly coating the internal disc surface. Scale or other foreign matter collecting on the disc could have the result of substantially increasing the response time of the sensor.

The valve including valve head 48 and valve stem 64 provides a substantially universal mount for a wide variety of temperature sensing apparatus. For example, the valve will provide a seat for a temperature sensor including an RTD sensor (either single or multiple), a thermistor (either single or multiple) of substantially all calibrations, a thermocouple (either single or multiple) of substantially all calibrations, and combinations of multiple sensors including but not limited to those previously mentioned. The valve, further, not only permits ease of replacement, of all types of fast-response, all-glass-covered temperature sensors but replacement with speed. Further still, the temperature sensing operation provided by the valve head 48 is one carried out in a manner that all gasket construction and metal of the prior art sensing apparatus is removed from position exposed to the interior of the vessel and the batch. The valve construction with the capability of receiving internal sensing apparatus, initially provided without such apparatus, may be easily field retrofitted with a fast response temperature sensor. Additionally, the valve with fast response temperature sensor may easily replace a valve without temperature sensing capability or a valve with temperature sensing capability of the prior art.

We claim:

1. A valve for disposition within an outlet nozzle disposed in a lowermost portion of a reaction vessel, comprising:

a valve seat adapted to be mounted in an outlet nozzle;

a metallic valve member, comprising a valve head and a valve stem;

means for moving said valve member generally vertically with respect to said valve seat, to open and close said valve;

a disc of metallic heat conductive material not more than about 2 mm thick assembled to and forming an outer surface of the valve head;

a socket for receiving a temperature sensing element formed within said valve head and sealed from the interior of the vessel by said disc, said valve head and said disc having a coating comprising a glass material, and a sensing element disposed in said socket and in efficient thermally conductive relation with an inside surface of said disc.

2. The valve of claim 1 wherein a bore is formed extending from said socket through said valve stem through which conductors connected to said sensing element extend.

3. The valve of claim 1 further comprising means for urging the sensing element against the inside surface of said disc.

4. The valve of claim 1 wherein the inside surface of said disc is coated with a thermally conductive ceramic material.

5. The valve of claim 1 wherein a quantity of heat conductive grease is applied to said sensing element to promote thermal conductivity between said element and said disc.

6. The valve of claim 1 in combination with a glass lined reaction vessel having a nozzle disposed in a lowermost portion.

7. The valve of claim 1 wherein said glass coating extends from said valve head so as to cover the valve stem.

* * * * *